United States Patent [19]

Bunas et al.

[11] 3,998,726
[45] Dec. 21, 1976

[54] HYDROCARBON DEASPHALTING PROCESS AND SOLVENT EXTRACTOR THEREFOR

[75] Inventors: Bennie I. Bunas; James S. Kellar, both of Des Plaines, Ill.

[73] Assignee: Universal Oil Products Company, Des Plaines, Ill.

[22] Filed: June 25, 1975

[21] Appl. No.: 590,186

[52] U.S. Cl. .................................. 208/309; 208/86
[51] Int. Cl.² ......................................... C10G 21/14
[58] Field of Search ............................. 208/309, 86

[56] References Cited

UNITED STATES PATENTS

| 2,086,487 | 7/1937 | Bahlke et al. | 208/309 |
| 2,950,244 | 8/1960 | Lawson | 208/309 |
| 3,423,308 | 1/1969 | Murphy | 208/309 |

*Primary Examiner*—Herbert Levin
*Attorney, Agent, or Firm*—James R. Hoatson, Jr.; Robert W. Erickson; William H. Page, II

[57] ABSTRACT

Maximum removal of asphaltic material, including high molecular weight metallic contaminants, from a hydrocarbonaceous charge stock is achieved through the utilization of a solvent extraction zone provided with direct heating facilities in an upper portion thereof.

9 Claims, 1 Drawing Figure

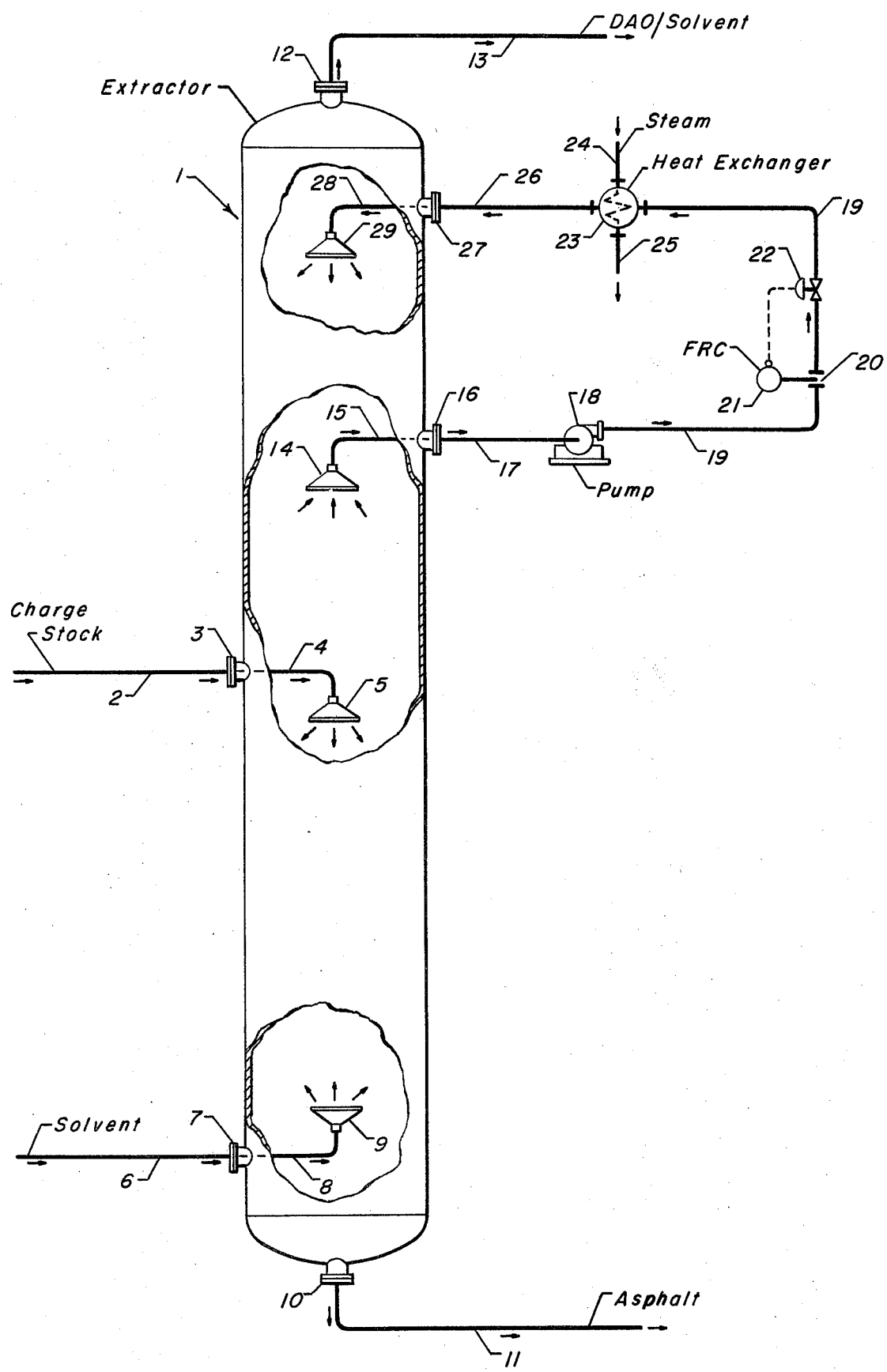

3,998,726

HYDROCARBON DEASPHALTING PROCESS AND SOLVENT EXTRACTOR THEREFOR

APPLICABILITY OF INVENTION

Our invention, as herein described, is intended for utilization in the removal of hydrocarbon-insoluble asphaltenic material from hydrocarbonaceous charge stocks containing the same. More specifically, the invention is directed toward a process for deasphalting atmospheric towers bottoms, vacuum towers bottoms (vacuum residuum), crude oil residuum, topped crude oils, coal oil extract, shale oils, oils recovered from tar sands, etc., all of which have come to be referred to in the art as "black oils," and which contain varying quantities of asphaltic material.

Petroleum crude oils, particularly those heavy oils extracted from tar sands, topped or reduced crudes, vacuum residuum contain high molecular weight sulfurous compounds in exceedingly large quantities. In addition, black oils contain excessive quantities of nitrogenous compounds, high molecular weight organo-metallic complexes, principally containing nickel and vanadium, and varying quantities of asphaltenic material with which the metallic contaminants are generally associated. An abundant supply of such charge stocks exist, most of which have a gravity less than about 20.0 °API. Black oils are generally characterized, in the art, as having a boiling range indicating that at least 10.0% by volume, or more, boils above a temperature of about 1050° F.

Knowledgeable experts are presently predicting a world-wide energy crisis in the not-too-distant future. Those possessing expertise in the field of petroleum exploration are concerned with the ever-dwindling reserve supply of natural gas as compared to the ever-increasing demand thereof. As a result of legislation being imposed upon the sulfur content of liquid fuel oils, burned to meet certain energy requirements, more and more energy suppliers are looking to natural gas as a substitute. Several processes are being proposed which, it is believed, will alleviate the forthcoming critical shortage of natural gas. These generally involve the conversion of naphtha fractions, via steam reforming and shift methanation, into a "substitute" natural gas which is rich in methane. However, this in turn creates a shortage of naphtha boiling range material for utilization as motor fuel. Likewise, a shortage of kerosine boiling range fractions, principally employed as jet fuels, as well as gas oils, will stem from the necessity to convert such charge stocks to suitable automotive fuel. A multitude of factors are, therefore, contributing to the developing energy crisis. Processing technology is required to insure the utilization of virtually 100% of the available petroleum crude oil charge stocks. In the petroleum refining art, this is commonly referred to as converting the "bottom of the barrel."

The deasphalting process encompassed by the present invention supplies at least some of the technology required to permit utilization of hydrocarbonaceous black oils for ultimate conversion into distillable hydrocarbons. Specific examples of those charge stocks to which the present process is applicable, include a vacuum tower bottoms having a gravity of 7.1 °API, and containing 4.05% by weight of sulfur and 23.7% by weight of asphaltics; a "topped" crude oil having a gravity of 11.0 °API, and containing 10.0% by weight of asphaltics and 5.20% by weight of sulfur; and a vacuum residuum having a gravity of about 8.8 °API, containing about 3.0% by weight of sulfur, and having a 20.0% volumetric distillation temperature of about 1055° F.

When attempting the maximum recovery of distillable hydrocarbons via the catalytic conversion of such heavy hydrocarbonaceous material, the principal difficulty encountered involves declining catalyst activity and stability resulting from the lack of suitable processing techniques which permit the severe conditions required to convert nondistillables into lower-boiling products. Catalyst instability, when processing black oil charge stocks in a fixed-bed reaction system, also stems from the presence of the asphaltenic material. This consists primarily of high molecular weight, non-distillable coke precursors, insoluble in light hydrocarbons such as pentane or heptane, and with which are associated sulfur and metallic contaminants. The asphaltic material is dispersed within the black oil, and, when subjected to the operating conditions required, has the tendency to agglomerate and polymerize, as a result of which the active surfaces of the catalytic composite are effectively shielded from the material being processed. The metallic contaminants associated with the high-boiling asphaltenic fraction, also adversely affect catalyst stability and activity. Therefore, it behooves the industry to provide continued improved technology with respect to the removal of these high-molecular weight coke precursors while simultaneously recovering distillable hydrocarbons to the greatest possible extent.

OBJECTS AND EMBODIMENTS

A principal object of the present invention is to provide a more efficient solvent deasphalting process. A corollary objective involves the recovery of deasphalted oil (DAO) containing a lesser quantity of asphaltic material than heretofore obtained.

Another object of our invention is directed toward a solvent deasphalting unit requiring less maintenance, less initial capital investment and which will afford an extension of the effective on-stream time.

Therefore, in one embodiment, our invention provides a process for deasphalting an asphalt-containing hydrocarbonaceous charge stock which comprises the steps of: (a) countercurrently contacting said charge stock with a hydrocarbon-selective solvent, in a solvent extraction zone, at extraction conditions selected to produce a solvent-lean asphaltic stream and a solvent-rich hydrocarbon stream; (b) withdrawing said asphaltic stream from said extraction zone at a lower first locus thereof, and a solvent-rich deasphalted oil stream from an upper second locus thereof; (c) withdrawing at least a portion of said solvent-rich hydrocarbon stream from said extraction zone through a third locus intermediate said first and second loci, and increasing the temperature thereof; and, (d) introducing the heated portion of said solvent-rich hydrocarbon stream into said extraction zone through a fourth locus intermediate said second and third loci.

Other objects and embodiments of our invention reside in particular operating conditions and techniques, as well as preferred solvents for utilization in the extraction zone. For example, in one such other embodiment, the temperature of that portion of the solvent-rich hydrocarbon phase withdrawn through said third locus is increased from about 25°F. to about 125°F. above its original temperature.

PRIOR ART

It must be recognized and acknowledged that the prior art abounds with a wide spectrum of techniques utilized in the solvent deasphalting of asphaltic, hydrocarbonaceous charge stocks. In the interest of brevity, no attempt is herein made to delineate exhaustively such solvent deasphalting art. However, several illustrations of prior art deasphalting processes will be described briefly in order to show the particular area in which our invention is intended to be applied.

The broad concept of solvent deasphalting is discussed in U.S. Pat. No. 2,081,473 (Cl. 208-14). Suggested suitable solvents include light petroleum fractions, such as naphtha, casinghead gasoline and distillates which are normally vaporous at standard conditions of temperature and pressure. Preferred solvents are indicated as being liquefied normally gaseous hydrocarbons including methane, ethane, propane, butane, or mixtures thereof.

An improved deasphalting technique is described in U.S. Pat. No. 2,587,643 (Cl. 208–309) wherein the hydrocarbon solvents are utilized in admixture with a modifier comprising an organic carbonate. A similar technique is described in U.S. Pat. No. 2,882,219 (Cl. 208–86), wherein an aromatic hydrocarbon is added to the charge stock prior to subjecting the same to solvent extraction.

More recently, the integration of deasphalting with multiple-stage catalytic conversion is found in U.S. Pat. No. 3,775,292 (Cl. 208–86).

U.S. Pat. No. 3,830,732 (Cl. 208–309) describes a two-stage solvent deasphalting technique which initially provides a resin- and asphaltene-containing, solvent-lean hydrocarbon phase which is subjected to a second solvent deasphalting technique in order to recover a resin concentrate and to reject an asphaltic pitch.

SUMMARY OF INVENTION

When the chronological history of the art of solvent deasphalting is traced, it becomes apparent that those having the requisite expertise recognized the benefits afforded through the addition of heat to the upper section of the extraction zone (above the feed tray, or deck). This technique has the effect of increasing the quantity of precipitated asphaltic material withdrawn as the bottoms product. This so-called "top-heating" was, and continues to be, accomplished through the use, for example, of internally-disposed pipes and headers (tube banks), using external high-pressure steam as the heat-exchange medium. While this indirect heating technique did increase the amount of precipitated asphalt, it was at best only partially successful — e.g. a sufficient quantity of the asphaltic material remained in the deasphalted oil (DAO) to adversely affect the catalyst employed in a subsequent catalytic conversion system. Through the use of our invention, the carry over of asphaltenic matter with the DAO is further diminished, and the recovery of the latter is improved. In accordance with our inventive concept, the top-heating is accomplished directly by withdrawing a portion of the solvent-rich hydrocarbon phase from the extraction zone, through a locus above the column feed tray, and preferably above the uppermost tray, or deck therein. This stream is increased in pressure and heated to a temperature from 25° F. to 125° F. above that at which it was removed. The heated stream is then introduced into the extraction zone through a locus intermediate the locus through which the DAO/solvent overhead stream is withdrawn, and that locus through which the stream had been removed at the lower temperature. This technique is more efficient and permits more positive distribution of heat which results in a significantly better operation. In a preferred embodiment, the heated solvent-rich hydrocarbon stream is reintroduced through suitable distribution means which promotes phase separation of the precipitated asphalt.

In accordance with the present process, the asphaltic charge stock is countercurrently contacted with a hydrocarbon-selective solvent, in a solvent extraction zone, at extraction conditions selected to produce a solvent-lean asphaltic stream and a solvent-rich hydrocarbon stream. In the present specification as well as the appended claims, the term "solvent-rich hydrocarbon stream" is intended to allude to a stream in the upper section of the extraction zone as distinguished from the deasphalted oil/solvent stream removed as an overhead product. The solvent extraction zone will function at temperatures in the range of about 50° F. to about 600° F., and preferably from about 100° F. to about 400° F.; the pressure will be maintained within the range of about 100 to about 1,000 psig., and preferably from about 200 to about 600 psig. The solvent/charge stock volumetric ratio will be in the range of about 2.0:1.0 to about 30.0:1.0, and preferably from about 3.0:1.0 to about 10.0: 1.0. Judicious procedures involve the selection of temperature and pressure to maintain the extraction operations in liquid phase.

Suitable solvents include those hereinbefore described with respect to prior art deasphalting techniques. Thus, it is contemplated that the solvent will be selected from the group of light hydrocarbons including ethane, methane, propane, butane, isobutane, pentane, isopentane, neopentane, hexane, isohexane, heptane, the mono-olefinic counterparts thereof, etc. Furthermore, the solvent may be a normally liquid naphtha fraction containing hydrocarbons having from about 5 to about 14 carbon atoms per molecule, and preferably a naphtha distillate having an end boiling point below about 200° F. With respect to the group of light hydrocarbons containing from about 3 to about 7 carbon atoms per molecule, preferred techniques dictate the utilization of a mixture thereof. For example, suitable solvent mixtures will comprise normal butane and isopentane, propane and normal butane, normal butane and normal pentane, etc.

The asphaltic, hydrocarbonaceous charge stock is introduced into the extraction zone in a downwardly direction, and therein contacts an upwardly flowing solvent stream. A solvent-lean asphaltic stream is withdrawn from the extraction zone at a first locus in the lower portion thereof. The solvent-rich deasphalted oil stream is removed from an upper, second locus thereof. The rejected asphaltic pitch will contain virtually all of the metallic contaminants originally present in the fresh feed charge stock. The sulfur content will be approximately twice that of the charge stock. A portion of the solvent-rich hydrocarbon stream is withdrawn from within the extraction zone through a third locus which is intermediate the first and second loci, and is increased in temperature at least about 25° F. to about 125° F. For example, this stream may be withdrawn at a temperature of about 220° F. and reintroduced into the extraction zone at a temperature of about 270° F.

The thus-heated stream is introduced through a fourth locus in a downwardly direction using suitable distributing means to provide and promote phase separation of the asphaltenic material. Additional asphaltic material, including high-boiling sulfurous compounds and the asphalt-associated metallic contaminants, is precipitated and the recovery of DAO increased.

As contrasted to the prior art technique of indirect top-heating through, for example, the use of tube banks, the above-described direct heating scheme involves less maintenance, is more efficient and provides stability of operation as a result of more positive heat distribution. Furthermore, less tower space is consumed for top-heating purposes and a significantly longer on-stream time is afforded.

Other conditions and preferred operating techniques will be given in conjunction with the following description of the present process. Reference will be made to the accompanying drawing in which details such as compressors, pumps, heaters and coolers, instrumentation and controls, heat-exchange and heat-recovery circuits, valving, start-up lines and similar hardware have been eliminated, or reduced in number as being non-essential to an understanding of the present invention. The use of such miscellaneous appurtenances is directed principally to the recovery of solvent for recycle to the extraction zone, and such is well within the purview of those skilled in the art. The use thereof, to modify the present process, is within the scope and spirit of the appended claims. DESCRIPTION OF DRAWING For the purpose of demonstrating the illustrated embodiment, the drawing will be described in connection with the solvent extraction of a vacuum column bottoms feed stock in a commercially-designed unit. It is understood that the charge stock, stream compositions, operating conditions and the like are exemplary only, and may be varied widely without departure from the spirit of our invention. The charge stock has a gravity of 8.8 °API, an average molecular weight of about 620 and is processed in an amount of about 13,400 Bbl./day. The hydrocarbon-selective solvent is a 50/50 mixture of normal butane and isopentane, and the solvent to charge stock volumetric ratio is 5.0:1.0.

With reference now to the drawing, there is illustrated, in a partially-sectioned view, an extraction columm 1. In the interest of simplicity, the decks, or trays have not been shown; the design of these will generally be selected on the basis of charge stock characteristics, the solvent and the desired recovery of DAO. The charge stock, in the amount of 318.03 moles/hr., admixed with about 365.89 moles/hr. of the hydrocarbon-selective solvent, is introduced into extraction zone 1 via line 1 and inlet port 3. The combined feed enters the column by way of line 4 at a temperature of about 230° F. and a pressure of about 370 psig., and is directed downwardly by way of distribution means 5. Generally, the combined feed will be introduced above one of the top five trays, or decks in the extraction zone. The solvent mixture of normal butane and isopentane, in the amount of 8,781.29 moles/hr., is introduced via line 6 and inlet port 7, and is directed in an upwardly direction by way of line 8 and distributor 9 at a temperature of about 220° F. and a pressure of about 370 psig. In general, the solvent mixture is introduced into the extraction zone below the lowermost tray, or deck.

The precipitated asphalt phase is withdrawn from the bottom of the extraction zone through outlet port 10 and line 11, at a temperature of 225° F. and a pressure of about 370 psig., and consists of 49.77 moles/hr. of asphaltenic material, about 119.52 moles/hr. of normal butane and about 102.95 moles/hr. of isopentane. This stream is transported to a suitable solvent recovery system from which the solvent is recycled to the extraction zone. Deasphalted oil, in the amount of 268.26 moles/hr., 4,794.66 moles/hr. or normal butane and 4,130.05 moles/hr. of isopentane are removed through outlet port 12 and line 13, at a temperature of about 270° F. and a pressure of about 350 psig. This material is also transported to a solvent recovery facility from which the solvent is recycled to the extraction zone.

About 9,206.00 moles/hr. of the solvent-rich hydrocarbon phase is internally withdrawn through suction means 14 and line 15, removed from the extraction zone through outlet port 16 and introduced, via line 17 into pump 18. The latter discharges via line 19, containing fluid-metering means 20 which transmits a flow rate signal to Flow Recorder Controller (FRC) 21. The latter adjusts control valve 22, in line 19, and the solvent-rich hydrocarbon phase continues therethrough into heat-exchanger 23. In this illustration, high-pressure steam from line 24 serves as the heat-exchange medium, and exits heat-exchanger 23 via line 25. The heated material, at a temperature of about 270° F., passes through line 26 and inlet port 27, to be discharged within the extraction zone through line 28 and distributing means 29, at a temperature of about 270° F. and a pressure of about 350 psig.

The foregoing clearly indicates the method by which our invention is effected and the benefits afforded through the utilization thereof. Deasphalted oil, containing less than about 0.05% by weight of asphaltenic material, is recovered in an amount of about 84.4 volume percent.

We claim as our invention:

1. A process for deasphalting an asphalt-containing hydrocarbonaceous charge stock which comprises the steps of:
    a. countercurrently contacting said charge stock with a hydrocarbon-selective solvent, in a solvent extraction zone, at extraction conditions selected to produce a solvent-lean asphaltic stream and a solvent-rich hydrocarbon stream;
    b. withdrawing said asphaltic stream from said extraction zone at a lower first locus thereof, and a solvent-rich desphalted oil stream from an upper second locus thereof;
    c. removing another solvent-rich hydrocarbon stream from said extraction zone through a third locus intermediate said first and second loci, and heating the same sufficiently to increase the temperature thereof by about 25° F to about 125° F; and,
    d. introducing the heated portion of said solvent-rich hydrocarbon stream into said extraction zone through a fourth locus intermediate said second and third loci.

2. The process of claim 1 further characterized in that said charge stock is introduced into said extraction zone through a fifth locus below said third locus.

3. The process of claim 1 further characterized in that said extraction conditions include temperatures in the range of about 50° F. to about 600° F., pressures from about 100 to about 1,000 psig. and a solvent/oil volumetric ratio in the range of about 2.0:1.0 to about 30.0:1.0.

4. The process of claim 1 further characterized in that the heated portion of said solvent-rich hydrocarbon stream is introduced through said fourth locus in a downwardly direction.

5. The process of claim 1 further characterized in that said solvent comprises a light hydrocarbon having from 3 to about 7 carbon atoms per molecule.

6. The process of claim 1 further characterized in that said solvent is a normally liquid naphtha fraction having an end boiling point below about 200° F.

7. The process of claim 5 further characterized in that said solvent comprises a mixture of normal butane and isopentane.

8. The process of claim 5 further characterized in that said solvent comprises a mixture of propane and normal butane.

9. The process of claim 5 further characterized in that said solvent is isopentane.

* * * * *